Patented June 30, 1942

2,288,392

UNITED STATES PATENT OFFICE 2,288,392

CONDENSATION PRODUCT OF ARYL AMINE AND LONG CHAIN ALIPHATIC COMPOUND

Garland H. B. Davis, Hillside, N. J., assignor to Standard Oil Development Company, a corporation of Delaware No Drawing. Application July 19, 1938, Serial No. 220,001

8 Claims. (Cl. 260—576)

The present invention relates to improvements in wax modifying agents which may be used for depressing the pour points of waxy lubricating oils and as aids in separating wax from such oils.

The present wax modifying agents are prepared by condensation of suitable paraffinic substances with aromatic amino compounds. The paraffinic substances which are included herein are those having relatively long hydrocarbon chains, for example, of at least 10 carbon atoms. They must be capable of condensation with the aromatic substance, but the nature of the reactive group depends on the method used for condensation as will be disclosed below. Among the types of paraffinic substances that can be used may be included the halogenated hydrocarbons, as well as olefins derived therefrom, and also reactive alcohols, ethers, esters, ketones and the like which have long hydrocarbon chains as indicated above.

The aromatic amino compounds may be simple primary amines, such as aniline, alpha and beta naphthylamine, or the corresponding amines of anthracene and phenanthrene. Secondary and tertiary amines may also be used, as will be understood. Polyamines may be employed by which term is meant compounds which have more than one amino group, but it will be understood that since the reaction which gives rise to the wax modifying agent is an alkylation of the ring by means of the long chain paraffinic substance, it is desirable to have not more than say two amino groups attached to a single ring. More than two amino groups, however, may be included in multi-ring amines.

Alkylated aromatic amines may be employed such as methyl aniline, ethyl naphthylamines, butyl or amyl substituted products, but as before, it is undesirable to have more than one alkyl group attached to the same ring with an amino group in order that a free condensation of the paraffinic substance on the ring may be obtained.

The condensation may be effected either by chemical or electrical means and the nature of the paraffinic substance to be condensed upon the amine may be varied somewhat depending on the particular type of condensation employed. If chemical condensation is used, the saturated paraffinic substances should not be employed or rather they should be treated so as to introduce some exchangeable substituent, for example chlorine or other halogen atom, or some reactive group such as an olefin bond before the condensation with the aromatic amine is effected. Paraffin wax, for example, may be chlorinated to 10 or 12% by weight and the condensation is then effected or, better, the chloro-wax may be dechlorinated to form an olefin and this latter compound is condensed on the amino compound. The same procedure may be followed with other paraffinic compounds of a saturated nature. If acids or alcohols are employed, they may be thus converted into the corresponding chloro or unsaturated acids or alcohols or, in the case of the latter, they may be converted to acid chlorides since these materials condense on the amines in the same manner. Chemical condensation is effected by means of aluminum chloride or other equivalent catalyst of the Friedel-Crafts type, such as zinc and iron chlorides. The temperature of reaction is upward of room temperature, for example, to about 300° F. or somewhat higher, although it is, of course, preferable to limit the temperature so as to prevent decomposition. The time and temperature of reaction are both somewhat variable, depending on the specific reactants, but time as low as two or three hours is usually sufficient to give a powerful inhibitor, although it may be longer if desired, particularly at low temperatures. After the hydrochloric acid evolution has largely subsided, the catalyst is preferably hydrolyzed by the addition of water, alcohol or other suitable agent and the organic material may be extracted with naphtha, kerosene or other suitable solvent. The kerosene and the inactive lower molecular weight fractions are distilled, leaving the desired wax modifying agent as a distillation residue.

The condensation may be carried out by electrical means and if this means is employed, it is possible to use saturated paraffinic substances as such, and it is not necessary to introduce unsaturated or other more reactive compounds, although unsaturated materials react more readily even under the influence of the electric current than do the saturated substances. The condensation takes place under the influence of high voltage, high frequency, electric discharge in an evacuated reaction space. The reactants are mixed in the desired proportions and heated to the melting point if they are originally solid, and are kept in a foaming condition preferably by the introduction of a small amount of a suitable gas below the surface of the liquid. Hydrogen is probably the most suitable gas for the purpose, although nitrogen, carbon monoxide, carbon dioxide, methane and the like may be employed. Voltages of from 10,000 to 15,000 volts and frequency of 10,000 to 15,000 cycles per second are preferably employed. The time of reaction is usually quite long, especially if saturated materials are employed and may be as long, for example, as 50 to 300 hours, depending of course on the power output. Care should be taken not to carry the treatment too long as oil insoluble materials are produced in this way.

The product is then recovered either by distillation of the lower boiling ingredients, or the desired high molecular weight substance may be precipitated by the addition of suitable substances such as light hydrocarbons, liquid propane, butane, naphthas or low boiling alcohols and ketones or mixtures of the same with naphtha or aromatic hydrocarbons. The lighter inactive materials can be dissolved in such materials at temperatures and under conditions in which the polymers are insoluble. The lighter products may then be returned for further condensation.

The proportions of the paraffinic substance to the aromatic amine may vary considerably, but the amount of the paraffinic substance is considerably in excess of the amount of the amine which should be from 3 to 15% by weight, and preferably the amine amounts to from about 5 to 10% by weight of the paraffinic substance.

In order to reduce the pour point of lubricating oils, these materials are added in proportion up to about 5% and they are useful as dewaxing aids when added to waxy oil in substantially the same proportions. The oil is diluted with known dewaxing solvents such as low boiling alcohols, ketones and the like and the mixture is cooled to a wax solidification point. Chilling may be carried out more rapidly in the presence of wax modifiers and the wax is found to separate much more completely and more rapidly. It may be removed by any suitable mechanical means such as filtration, sedimentation or centrifugation.

The invention will be fully understood from the following examples:

Example I

Paraffin wax, chlorinated to about 11% chlorine, was dechlorinated by gradual heating to 650° F. Hydrogen chloride was evolved and removed and olefins were obtained with no substantial splitting of carbon to carbon bonds.

To 75 cc. of tetrachlorethane as solvent were added 100 grams of dechlorinated wax and 5 grams of diphenylamine. The mixture was agitated at room temperature and 10 grams of aluminum chloride were added all at once. This mixture was then refluxed at the boiling point of the solvent for three hours. After cooling the mixture was hydrolyzed with a mixture of ice and hydrochloric acid and extracted with kerosene. The extract was washed free of acid, dried and distilled under high vacuum to 600° F., so as to remove kerosene, solvent and unreacted wax.

The distillation residue was a brown, oily, semisolid of which 65 grams were recovered. When added to a wax-containing oil, the pour point was reduced as follows:

| | Pour point °F. |
|---|---|
| Original oil | +30 |
| Original oil + 1% residue | +15 |
| Original oil + 5% residue | 0 |

Example II

The procedure of Example I was repeated except that 15 grams of AlCl₃ were used to carry out the condensation reaction. The reaction product was recovered as before yielding 52 grams of a brown wax-like solid. When added to a wax-containing oil, the pour point was reduced as follows:

| | Pour point °F. |
|---|---|
| Original oil | +30 |
| Original oil + 1% residue II | +10 |
| Original oil + 5% residue II | −10 |

Example III

The procedure of Example I was repeated except that para-tertiary-amyl aniline was substituted for the diphenylamine. About 46 grams of residue were obtained on distillation which was about as potent as the material of Example I.

| | Pour point °F. |
|---|---|
| Original oil | +30 |
| Original oil + 1% residue | +15 |
| Original oil + 5% residue | + 5 |

Example IV 800 cc. of chloro-wax (10.5% chlorine content and 125 grams of triphenyl guanidine

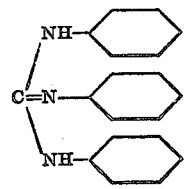

were placed in a 3-liter-3 neck round bottom flask fitted with stirrer, thermometer and outlet for HCl gas. The reaction mixture was brought up to 300° F. and maintained at this temperature throughout the reaction. Fifty grams of anhydrous AlCl₃ were slowly added over a period of one hour and the reaction was allowed to proceed two hours further at 300° F. After cooling the reaction mixture to 125° F., it was diluted with 1000 cc. of kerosene and neutralized with caustic solution and alcohol. After settling in a funnel the kerosene extract was filtered and then distilled with fire and steam to 600° F. to remove solvent and unreacted wax. A distillation residue of 150 grams was obtained.

The pour depressor potency of the product obtained was tested by blending in a wax-bearing oil. The following results were obtained:

| | Pour point, °F. |
|---|---|
| Original oil | +30 |
| Original oil + 5% product | + 5 |

This application is a continuation-in-part of Serial No. 623,814, filed July 21, 1932, and Serial No. 65,648, filed February 25, 1936, for Garland H. B. Davis which have now become abandoned.

The present invention is not to be limited by any theory of the mechanism of the reaction or to the use of any particular ingredients, but only to the following claims in which it is desired to claim all novelty inherent in the invention.

I claim:

1. An improved wax modifying agent comprising essentially a high molecular weight alkylated aryl condensation product of a paraffinic hydrocarbon having a chain of at least ten carbon atoms and an aryl amine, the amount of paraffinic substance being considerably in excess of the amount of the amine, said product resulting from an alkylation of the ring of the aryl amine and being substantially non-volatile at temperatures up to about 600° F.

2. An improved wax modifying agent comprising essentially a high molecular weight alkylated aryl aluminum chloride condensation product of olefins obtained from wax without material breaking of the carbon to carbon linkages with 3% to 15% by weight of an aryl amine, said product resulting from an alkylation of the ring of the aryl amine and being substantially non-volatile at temperatures up to about 600° F.

3. The process of preparing wax modifying agents which comprises condensing a long chain aliphatic compound selected from the group consisting of halogenated hydrocarbons and olefinic hydrocarbons containing at least 10 carbon atoms, with an aryl amine using a Friedel-Crafts catalyst at a temperature between the approximate limits of room temperature and 300° F., hydrolyzing and removing the catalyst, and distilling the condensation product to obtain a high molecular weight residue which is substantially non-volatile at temperatures up to about 600° F.

4. The process of preparing wax modifying agents which comprises condensing an aryl amine with long chain olefines having at least 10 carbon atoms obtained by chlorination of paraffin wax and dechlorinating the resultant chlorinated wax, carrying out said condensation in the presence of aluminum chloride as catalyst, at a temperature between the approximate temperature of room temperature and 300° F., the amount of the aryl amine used being about 3–15% by weight of the olefines, hydrolyzing and removing residual catalyst and distilling the condensation product to about 600° F. under high vacuum to obtain a high molecular weight distillation residue having wax modifying properties.

5. A high molecular weight condensation product of an aryl amine and a long chain aliphatic compound containing at least 10 carbon atoms, substantially non-volatile at temperatures up to about 600° F., said product resulting from an alkylation of the ring of the aryl amine, and having the property of reducing the pour point of waxy mineral lubricating oils when added thereto in small amounts.

6. A product comprising essentially a high molecular weight alkylated aryl condensation product of olefins obtained from paraffin wax without material breaking of the carbon to carbon linkages with 3%–15% by weight of diphenyl amine, said product resulting from an alkylation of the ring of the diphenyl amine, and said product being substantially non-volatile at temperatures up to about 600° F.

7. The process which comprises essentially condensing a long chain aliphatic compound selected from the group consisting of halogenated hydrocarbons and olefinic hydrocarbons containing at least 10 carbon atoms, with an aryl amine, using an amount of aliphatic compound considerably in excess of the amount of the amine, under conditions to effect alkylation of the ring by the aliphatic compound, to produce a high molecular weight oil-soluble condensation product, and distilling the condensation product to obtain therefrom a fraction which is substantially non-volatile at temperatures up to about 600° F. and having the property of depressing the pour point of waxy mineral lubricating oils when added thereto in small amounts.

8. The process which comprises essentially chlorinating paraffin wax to a chlorine content of about 11%, dechlorinating the product by gradual heating to about 650° F. to obtain the corresponding olefin, adding said dechlorinated wax together with diphenyl amine to tetrachlor-ethane as solvent, mixing said materials at room temperature and adding aluminum chloride thereto, using proportions of said materials corresponding to the following amounts:

| | | |
|---|---|---|
| Dechlorinated wax | grams | 100 |
| Diphenyl amine | do | 5 |
| Tetrachlor-ethane solvent | cc | 75 |
| Aluminum chloride | grams | 15 | next refluxing the resultant mixture at the boiling point of the solvent for about three hours, cooling and hydrolyzing the mixture with a mixture of ice and hydrochloric acid and extracting the condensation product with kerosene, separating and washing the extract free of acid and distilling the condensation product under high vacuum to about 600° F. to remove kerosene solvent and unreacted wax and to recover as distillation residue a high molecular weight oil-soluble product having pour-depressing properties.

GARLAND H. B. DAVIS.